July 13, 1926.
B. M. W. HANSON
1,592,765
FINISHING TAP
Filed May 3, 1924
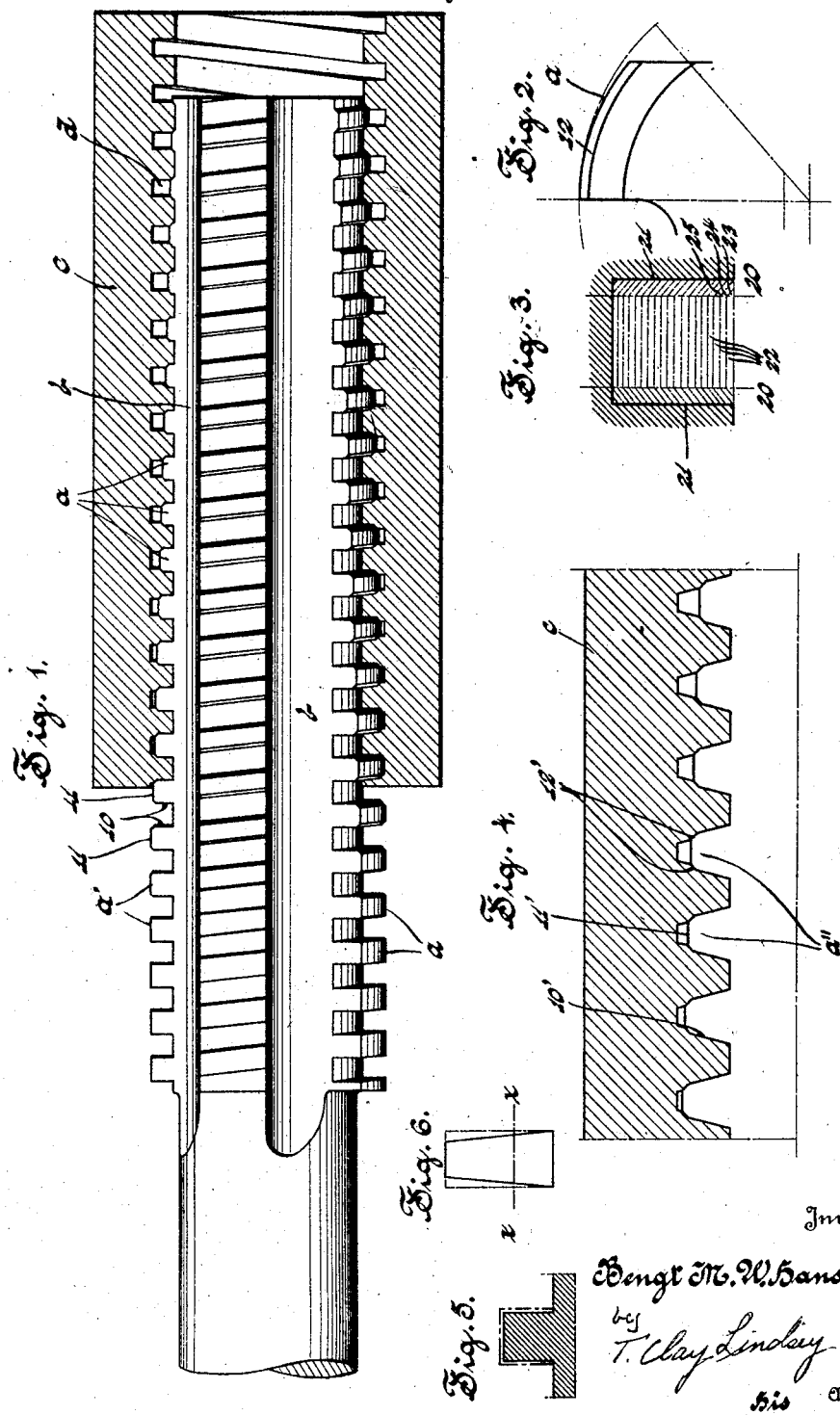
Inventor
Bengt M. W. Hanson
by T. Clay Lindsey
his Attorney Patented July 13, 1926.

1,592,765

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

FINISHING TAP.

Application filed May 3, 1924. Serial No. 710,924.

This invention relates to finishing taps, and has as its aim to eliminate certain objections and disadvantages incident to taps of this sort as heretofore constructed.

Generally speaking, in producing a square thread in a nut, for instance, the thread groove is first roughed out almost to the full diameter but not to the full width as by means of a chasing operation on a lathe or by a roughing tap. The roughed out groove is then completed by a finished tap, the teeth of which, as originally formed, correspond in width at their cutting edges to the desired width of the thread groove and gradually increase in height to the full depth of the groove, so that these teeth take out successive chips in the sides of the roughed out thread. In order to prevent sticking or freezing of the tool in the work, it is customary to relieve the top cutting edges and the side cutting edges of the several teeth. The necessary clearance behind the side cutting edges has been had by hand filing the side faces, bringing the teeth approximately to the shape shown in Figs. 5 and 6, which are front and top views of a tooth such as has been provided on finishing taps for square threads. From these figures, it will be clear that the width of the tooth gradually decreases from its forward face to its rear end. With this old arrangement, when the teeth are sharpened by grinding their front faces, the width of the teeth, at their cutting edges, is reduced. That is to say, assuming that the front face of the tooth has been repeatedly sharpened until the tooth has been ground back to the line $x$—$x$ of Fig. 6, the shape of the tooth at its cutting edges will have been brought to the configuration and size of the shaded area in Fig. 5, which means that the teeth will no longer cut the thread groove to the full desired width. Owing to practical difficulties, on account of the side cutting edges being substantially at right angles to the axis of the tap, it has been necessary to relieve these side edges by hand, as by filing, a very tedious operation which results in unavoidable inaccuracies and which materially increases the cost of manufacture. Also, it has been necessary, in the past, to provide a finishing tap of this sort with a pilot at its smaller end, so that the cutting teeth will properly register with the cut-out groove. What has been said with respect to a tap for cutting square threads applies, but to a lesser degree, to a finishing tap for cutting Acme threads.

The aim of the present invention is to provide an improved tap, the teeth of which will cleanly and smoothly cut chips from the work giving a smooth, fine finish to the side of the thread groove and which will maintain the desired width of thread groove irrespective as to the extent to which the tooth has been cut back after repeated re-sharpening operations. To this end, I provide a tap having a portion with teeth of like width at like distances from the axis of the tap but gradually increasing in height preferably followed by a portion provided with teeth corresponding in size and shape to the final thread groove; the teeth on the first portion having their corners between their side and top faces chamfered and relieved throughout the length of the teeth. In the case of a finishing tap for cutting square threads, the side faces of the teeth, which are radially within the chamfered portions, are not relieved. With this arrangement, the tap is most effective in operation in that the teeth thereof quickly remove the stock with the requirement of a minimum amount of power, the teeth cut very smoothly, the tool does not clog or bind because the chips are flat and relatively thin so that they may curl and readily free themselves, and a finely finished thread, free from all chatter marks and blemishes and accurate in lead and shape, is economically obtained. It will be seen that the teeth are substantially of uniform width throughout their length so that no matter how far the front faces of the teeth may be cut back, after being repeatedly re-sharpened, they will always cut the thread groove to the full width. The tap may be very economically manufactured, particularly so as the chamfering and relieving of the corners of the teeth may be mechanically effected as, for instance, by the same machine which is employed to give the necessary clearance to the top faces of the teeth. My improved tap further is of advantage in that it is not necessary to provide the same with a pilot at its smaller end because, owing to the fact that the corners of the teeth are chamfered, these teeth will automatically bring themselves into proper registry with the roughed out groove in the work.

In the accompanying drawings,

Figure 1 is a view illustrating my improvements incorporated in a finishing tap for cutting square threads, the tap being shown as forming a thread in a nut which is illustrated in longitudinal section;

Fig. 2 is a side view on an exaggerated scale showing diagrammatically one of the teeth with which the tap is provided.

Fig. 3 is a diagrammatic view showing on an enlarged scale the manner in which chips are cut out of the work to form a thread groove;

Fig. 4 is a view similar to Fig. 1, but illustrating my improvements incorporated in a finishing tap for cutting an Acme thread; and Figs. 5 and 6 are front and top views, respectively, of a tooth of the type with which taps as heretofore constructed were provided.

Referring to the drawing in detail, and particularly to Figs. 1 to 3, the finishing tap is shown as having a tapered portion provided with helically arranged teeth $a$ of uniform inside or root diameter but gradually increasing in height from the forward or small end of the tap to the rear end. That is to say, the teeth are similar in width at like radial distances from the axis of the tap. These teeth correspond in width to the desired width of the final thread groove in the work, which is the same thing as saying the space or groove between the teeth corresponds to the desired width of the thread being produced on the work. Each of the teeth, except the foremost or smallest ones, have parallel sides edges 10 and an end or top cutting edge 11, and the latter edges are preferably parallel to the axis of the tap. Following the tapered portion of the tap is a straight portion having teeth $a'$ of uniform outside diameter and the same root diameter as the teeth on the tapered portion. The tops of all of the teeth are relieved back of their front edges, as is shown most clearly in Fig. 2. Between the rows of teeth are the usual flutes $b$. $c$ designates the work which may be assumed to be a long nut, and $d$ is the roughed out internal thread groove in the work.

In accordance with the present invention, each of the teeth $a$ and the foremost of the teeth $a'$, have their corners between the side and top faces of the teeth chamfered or bevelled as at 12. These bevelled corners are relieved back of their forward edges so as to provide the necessary clearance, which means that the teeth will take a smooth cut without rubbing the work rearwardly of the cutting edges, and thus freezing or binding of the tool is eliminated. It will be noted that the chamfered surfaces are at a relatively pronounced angle so that these surfaces may be cut back or relieved in a very simple and economical manner and by the use of the same machines which are employed for relieving the top surfaces of the teeth. With the arrangement described, it is not necessary to provide the tap at its smaller end with a pilot, for it is obvious that the cutting teeth at the forward end of the tap, in addition to cutting into the work, act as guides for properly centering the teeth on the tap with respect to the roughed out groove.

The manner in which my improved tap operates is clearly shown in Fig. 3. The vertical lines 20 indicate the sides of the roughed out groove, and the heavy black line 21 indicates the outline of the groove as finally formed. The roughing tool, in roughing out the groove, takes out a succession of relatively flat chips 22, 22, etc. The diagonal lines between the lines 20 and 21 indicate the outline of the chips which are cut out by the teeth of the finishing tool. These chips are flat and are indicated by the numerals 23, 24, 25, etc. It will be observed from this figure that were the corners of the finishing tap not chamfered or bevelled, and the same number of teeth were provided, the chips cut out by these teeth would be of the same thickness as the chips 22. Owing to the fact that the corners are bevelled, as described, the chips which are cut out from the sides of the roughed out groove are relatively wider but thinner than the chips which would be taken out if the corners of the teeth were not bevelled. This is of advantage in that the chips, being relatively thinner, they may more readily curl up and free themselves, thus avoiding clogging of the flutes and sticking and chattering of the tool. As stated, the teeth $a'$ on the straight portion of the tap are of uniform outside and root diameters, as will be seen from Fig. 1. The foremost of the teeth $a'$ on the straight portion have their corners chamfered, and the extent of these chamfers gradually decreases so that the taking out of relatively thin chips by means of relieved cutting edges is carried out for the full depth of the thread, and excessive strains on any one tooth is avoided. The final teeth on the straight portion are square and preferably are of the exact dimension and shape as the thread groove to be formed in the work. It is understood that the radial side faces of the teeth $a$ need not be relieved rearwardly of their forward edges because these edges do not cut, the material of the work in front of the forward edges of these surfaces having been removed by the cutting edges of the chamfered portions 12 of preceding teeth. It will further be noted that the teeth are of uniform width throughout their lengths so that they will always cut grooves of the same widths irrespective as to the extent to which the front faces of the teeth have been ground to resharpen them, which means that the tool will have a very long life and, throughout its life, will produce uniform and accurate threads. It will further be observed that, by preference, the inclined or chamfered surfaces are uniform in width from the forward to the rear edge of the teeth.

While the improvements of the present invention find peculiar adaptation in connection with a finishing tap for cutting a square thread, they also are of advantage when incorporated in a tap for cutting an Acme thread. Such an arrangement is shown in Fig. 4. In this figure, the teeth of the tap are indicated by the letter $a''$, and the groove between these teeth is of uniform root diameter and the height of the teeth gradually increases as in the preceding embodiment. The corners between the side faces 10' and the top face 11' are chamfered as at 12', and these bevelled surfaces are relieved back as in the preceding embodiment.

I claim as my invention:

1. A finishing tap provided with teeth of progressively increasing height and of like width at like distances from the axis of the tap, the corners of the teeth between the side and top faces being chamfered and relieved, the non-cutting forward edges of said side faces, radially within said chamfers, being substantially unrelieved.

2. A finishing tap for forming square threads having teeth with straight parallel side faces and a top surface relieved rearwardly of its forward edge, said teeth being of like width and gradually increasing in height form the forward end of the tap and having their corners between the side and top faces bevelled providing inclined surfaces which are relieved rearwardly of their forward edges.

3. A finishing tap for forming square threads having teeth with straight parallel side faces and a top surface relieved rearwardly of its forward edge, said teeth being of like width and gradually increasing in height from the forward end of the tap and having their corners between the side and top faces bevelled providing inclined surfaces which are relieved rearwardly of their forward edges, each of said inclined surfaces being substantially of uniform width throughout its length, and the non-cutting radial side edges being unrelieved.

4. A finishing tap having a portion tapered on its outside diameter and followed by a straight portion, the teeth on the tapered portion gradually increasing in height and being of like width at like distances from the axis of the tap and having their corners between their side and top faces chamfered and relieved, each of said teeth being of substantially uniform width throughout its length, said straight portion having teeth corresponding in cross section to the desired shape of the thread groove, the foremost teeth of said straight portion being chamfered and relieved at their corners.

5. A finishing tap having a portion provided with teeth of like width at like distances from the axis of the tap but gradually increasing in height, the corners of said teeth between their side and top faces being chamfered and the inclined surfaces thus formed being relieved rearwardly of their forward edges, said tap having a straight portion following said first portion and provided with teeth of like outside and root diameters, the foremost teeth on said straight portion being chamfered on their corners, the chamfer of said last mentioned teeth gradually decreasing in extent.

6. A finishing tap for forming square threads having a tapered portion provided with teeth, each with straight parallel side faces and a top surface relieved rearwardly of its forward edge, said teeth being of like width and gradually increasing in height from the forward end of the tap and having their corners between the wide and top faces bevelled providing inclined surfaces which are relieved rearwardly of their forward edges, the non-cutting radial side edges being unrelieved, said tap having a straight portion following said first portion and provided with square teeth of like outside diameter and root diameter, the foremost of said straight teeth being chamfered on their corners and these chamfers gradually decreasing in extent.

BENGT M. W. HANSON.